US008449400B2

(12) United States Patent
Bare

(10) Patent No.: US 8,449,400 B2
(45) Date of Patent: May 28, 2013

(54) SAFETY GUARD FOR WIDE ANGLE PTO JOINT

(75) Inventor: Allan Bare, Ingleburn (AU)

(73) Assignee: Allan Bare, Inglebum (AU)

( * ) Notice: Subject to any disclaimer, the term of this patent is extended or adjusted under 35 U.S.C. 154(b) by 68 days.

(21) Appl. No.: 13/110,324

(22) Filed: May 18, 2011

(65) Prior Publication Data

US 2011/0287847 A1    Nov. 24, 2011

(30) Foreign Application Priority Data

May 18, 2010 (AU) ................. 2010201995

(51) Int. Cl.
*F16P 1/02* (2006.01)
(52) U.S. Cl.
USPC ............... 464/173; 292/256.69; 464/176
(58) Field of Classification Search
USPC ............ 464/173–175, 178, 176; 24/21, 24, 24/270; 292/256.69; 285/409; 74/609
See application file for complete search history.

(56) References Cited

U.S. PATENT DOCUMENTS

| | | | | |
|---|---|---|---|---|
| 1,898,742 A | * | 2/1933 | Phillips | 24/270 |
| 3,248,018 A | * | 4/1966 | Fleischman | 292/256.69 X |
| 4,205,761 A | * | 6/1980 | Gerster | 292/256.69 X |
| 4,663,984 A | | 5/1987 | Taylor | |
| 4,890,948 A | | 1/1990 | Bondioli | |
| 5,582,547 A | | 12/1996 | Offerhaus | |
| 7,240,930 B2 | * | 7/2007 | Stravitz | 285/409 X |
| 7,621,688 B2 | | 11/2009 | Bare | |

FOREIGN PATENT DOCUMENTS

| | | |
|---|---|---|
| DE | 39606410 | 9/1990 |
| EP | 0611896 | 8/1994 |
| GB | 1386684 A | 3/1975 |
| GB | 2235271 A | 2/1991 |
| WO | WO9806955 | 2/1998 |

* cited by examiner

*Primary Examiner* — Gregory Binda
(74) *Attorney, Agent, or Firm* — Michael F. Krieger; Kirton McConkie

(57) ABSTRACT

A safety guard (10) for use with a wide angle joint on an agricultural power takeoff (PTO) shaft comprises a guard housing that extends around the wide-angle joint when the guard is fitted. The guard housing comprises a first housing part (12) hingedly connected to a second housing part (14) to thereby allow the first housing part (12) and second housing part (14) to move relatively open to each other and relatively closed to each other about a hinge (19), a locking member (50, 54) to lock the first housing part (12) to the second housing part (14) in a closed condition and operable to be unlocked to allow the first housing part (12) and the second housing part (14) to be moved away from each other about the hinge. Each housing part (12, 14) includes a lip (44, 46) on one end thereof, the lip (44, 46) having a profile to match a profile of an end bellows (38) to which the guard (10) is attached. The safety guard (10) may further comprise one or more internal members (28, 30, 32, 34) to engage with a groove (25) provided in an outer surface of a guard support bearing (24). This further assists in maintaining the guard in position.

18 Claims, 3 Drawing Sheets

SAFETY GUARD FOR WIDE ANGLE PTO JOINT

CROSS-REFERENCE TO RELATED APPLICATIONS

This application claims priority to Australian Patent Application No. 2010201995, filed on May 18, 2010, which is incorporated herein by reference for all it discloses.

BACKGROUND OF THE INVENTION

1. Field of the Invention

The present invention relates to a safety guard suitable for use with wide angle joints as fitted to agricultural power takeoff shafts.

2. Background and Related Art

Worldwide standards dictate that agricultural power takeoff (PTO) shafts must be enclosed by an approved safety guard. A safety guard for a standard PTO is shown in my Australian patent number 2005202533 also published as U.S. Pat. No. 7,621,688), the entire contents of which are incorporated herein by cross-reference. Standard PTO guards typically comprise a hollow tube portion that fits over the PTO shaft and an enlarged portion at either end that fits over the end yokes of the PTO. Most standard PTO safety guards are also provided with a bellows at either end which extends further over the end joints of the PTO. The bellows are usually cylindrical or frusto-conical in shape and usually have a corrugated outer surface to allow for some bending in the bellows.

Standard agricultural PTO shafts incorporate universal joints that operate at angles of approximate 15 to 20°, with a maximum permitted angle of around 35°. Many modern trailed type PTO driven agricultural implements, such as sprayers and harvesting machines, require a PTO shaft with the ability to allow sharp turns by the tractor and the trailed implement. To meet this requirement, PTO shafts with wide angle joints (which allow rotation to wide angles, typically up to around 80°) are provided.

A typical construction for a wide angle PTO joint utilizes tandem Cardan type joints. Use of a double Cardan joint with an unsupported PTO shaft would result in the centre section of the shaft drooping and oscillating in an uncontrolled elliptical manner. To support and maintain axial alignment of the ends of the wide angle joint, a large diameter oscillating centre disc is incorporated. The centre of this disc engages with spigots provided on the adjacent joint end yokes. This disc slides in an elliptical manner within an outer disc housing.

The large diameter centre disc housing is provided with an outer bearing groove. This bearing groove is utilized to carry a bearing supporting the wide-angle portion of the PTO shaft safety guard, thus allowing the joints to rotate freely within the guard. The extreme operating angle of these joints dictates that the wide-angle portion of the guard (which overlies the wide-angle joint) must be carried on the joint itself.

Current agricultural safety guard requirements dictate that the tractor PTO shaft must be covered by a metal tractor master guard and that the implement PTO shaft must be guarded to a point close to the end of the implement shaft.

In use of present wide angle PTO joint safety guards, attempts to operate the implement PTO shaft attachment locking mechanism, which is typically obscured by the large diameter wide-angle shaft guard and the metal tractor guard, is extremely difficult and dangerous with heavy shafts located within the confines of the implement drive area.

The necessity to provide a wide-angle joint cover with a large outer diameter centre section to clear the joint centre disc housing while meeting the safety guard requirements of a small opening at the shaft attachment dictates that current full circle type guards cannot be slid back from the joint to facilitate shaft attachment.

Current versions of wide angle guards are generally attached by a number of screws or similar fasteners. This increases the time required to fit and remove the safety guard. Furthermore, even if the guard is dismantled, the small end diameter of the housing prevents access to the shaft end yoke.

BRIEF SUMMARY OF THE INVENTION

In a first aspect, the present invention provides a safety guard for use with a wide angle joint on an agricultural power takeoff (PTO) shaft, the safety guard being for use with a PTO safety guard that covers a PTO shaft, the PTO safety guard being provided with at least one end bellows, the safety guard comprising a guard housing that extends around the wide-angle joint when the guard is fitted, the guard housing comprising a first housing part hingedly connected to a second housing part to thereby allow the first housing part and second housing part to move relatively open to each other and relatively closed to each other about a hinge, a locking member to lock the first housing part to the second housing part in a closed condition and operable to be unlocked to allow the first housing part and the second housing part to be moved away from each other about the hinge, the safety guard being provided with one or both of: a) each housing part including a lip on one end thereof, the lip having a profile to match a profile of the end bellows; or b) one or more internal members to engage with a groove provided in an outer surface of a guard support bearing.

In one embodiment, the safety guard is arranged such that each housing part including a lip on one end thereof, the lip having a profile to match a profile of the end bellows.

In another embodiment, the safety guard includes one or more internal members to engage with a groove provided in an outer surface of a guard support bearing.

In another embodiment, the safety guard is arranged such that each housing part including a lip on one end thereof, the lip having a profile to match a profile of the end bellows and the safety guard includes one or more internal members to engage with a groove provided in an outer surface of a guard support bearing.

The lip may overlie an end corrugation of the end bellows. The lip may comprise a curved lip. The lip may curve inwardly so that the lip overlies an end corrugation of the end bellows. In this manner, the safety guard is securely held on the end bellows when it is locked in position.

The safety guard may further comprise one or more internal members to engage with a groove provided in an outer surface of a guard support bearing. This further assists in maintaining the guard in position. Each housing part may be provided with one or more internal members.

The end bellows may be similar to standard bellows as used in other applications. These bellows are fitted over the non-wide-angle portion of the safety guard, in lieu of the existing non-wide-angle bellows.

The wide-angle safety guard of the present invention can be quickly opened and removed by releasing the locking mechanism and opening the first housing part and second housing part by moving them about the hinge. This provides quick and clear access to wide-angle joints. The first housing part and the second housing part may move in a clamshell type movement.

In some embodiments, the locking mechanism comprises a locking lever pivotally mounted to one of the housing parts, the locking lever engaging with the other housing part when in a closed position to thereby hold the first housing part and the second housing part in a closed condition. The locking lever may be provided with an over-center action in order to assist in maintaining the locking lever in a closed position.

The locking lever may be provided with a locking tongue that overlies and engages a complementary shaped tongue or aperture in the other of the housing parts.

In some embodiments, the locking lever is fitted in a groove so that the locking lever is positioned below an outer surface of the housing when the locking lever is in the closed position. In some embodiments, the locking lever may be arranged such that it can only be operated with a screwdriver or similar tool inserted in a small slot in the housing. This also assists in preventing accidental opening of the safety guard.

In another embodiment, the groove into which the locking lever moves when in the locked position may be provided with one or more shaped protrusions on the side wall or walls. These protrusions are shaped to facilitate closing of the lever to a position below the protrusions. However, leveraged force of a screwdriver or similar tool may be required to lift the lever past the protrusions. The protrusions may comprise tapering protrusions that extend from a narrowest to a widest width in a direction from a top to a bottom of the protrusions. Effectively, the protrusions act as a secondary lock.

In some embodiments, the locking mechanism comprises a first lever having a locking tongue and a second lever being pivotally connected to one of the housing parts, wherein the first lever is pivotally connected to the second lever about an over-center action pivot connection. In this embodiment, the housing is locked in the locked position by engaging a locking tongue on the first lever under a shoulder, opening or the like in the other housing part and pressing down on the second lever to bring the second lever closer to the one of the housing parts. This pulls back on the first lever, by virtue of the over-center action of the first lever, to thereby lock the first lever in place.

In this embodiment, both the first lever and the second lever may sit in a groove when in the locked position. The groove may be provided with one or more shaped protrusions to assist in retaining the second lever within the groove when in the locked position.

In embodiments where the safety guard includes an internal member to engage with a groove provided in an outer diameter of a guard support bearing, closing the guard causes the lip of the guard to seat onto and grip the outer surface of the end bellows and the internal member to engage with the groove in the outer diameter of the guard support bearing to thereby lock the guard onto the bellows and the retaining bearing.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

Figure 1:
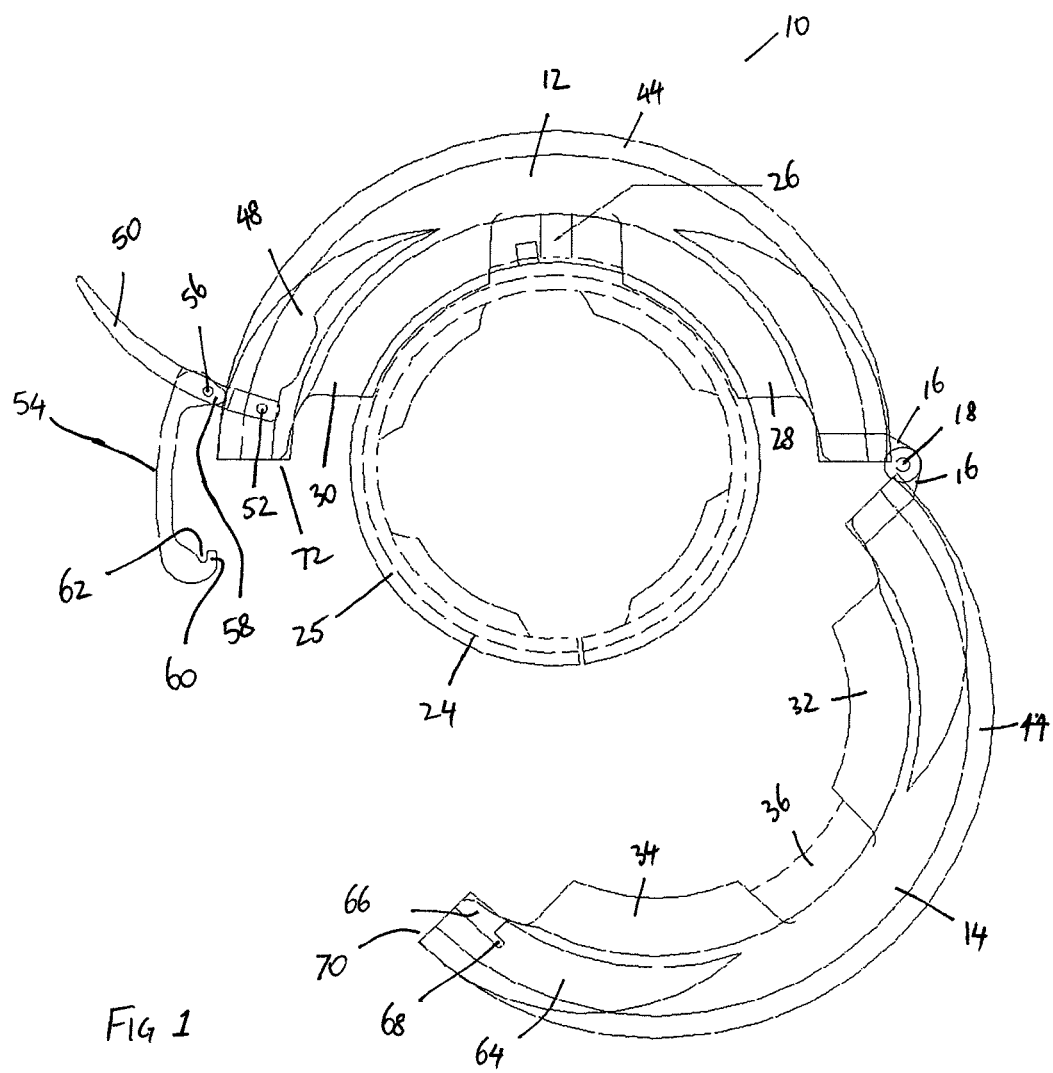
FIG. 1 shows a front view of a safety guard in accordance with an embodiment of the present invention, with the safety guard being in an open position.

It will be appreciated that the drawings have been provided for the purposes of illustrating preferred embodiments of the present invention. Therefore, it will be understood that the present invention should not be considered to be limited to the features as shown in the drawings.

The safety guard 10 shown in FIGS. 1 to 4 comprises a first housing part 12 and a second housing part 14. Housing parts 12, 14 are typically made from a rigid plastic material and may be made by molding. Each housing part 12, 14 has one or more tabs, generally denoted by reference numerals 16, extending from one end thereof. Each tab 16 defines an opening 18. The openings of the tabs are aligned and a hinge pin 19 is inserted through the openings 18 so that the first housing part 12 is connected to the second housing part 14 by a hinge. In this manner, the first housing part 12 and the second housing part 14 can move towards and away from each other about the hinge.

Figure 2:
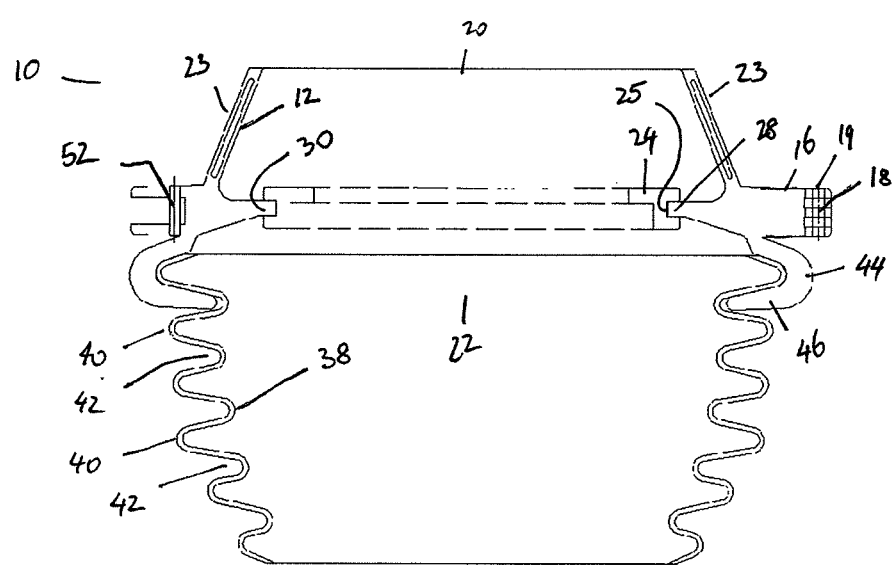
FIG. 2 shows a cross sectional side view of the safety guard shown in FIG. 1.
Figure 4:
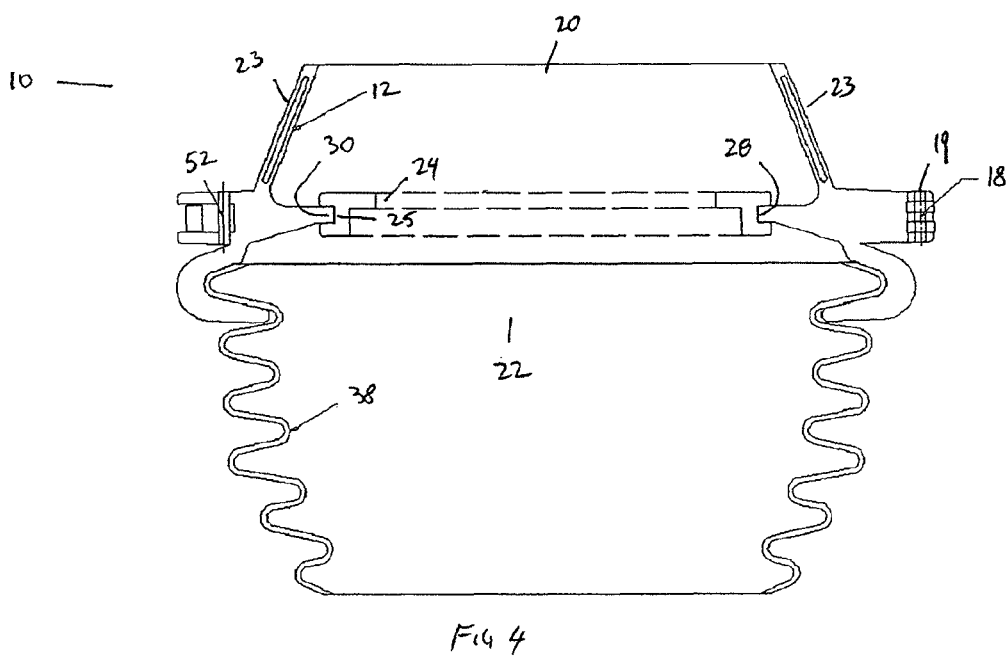
FIG. 4 shows a cross sectional side view of the safety guard show in FIG. 3.

As best shown in FIGS. 2 and 4, the safety guard 10 is of a generally frusto-conical shape. The safety guard 10 includes an upper opening 20 and a lower opening 22 and side walls 23 that enclose the wide angle joint.

The safety guard 10 is designed to fit around a wide angle joint used on a PTO. The safety guard 10 includes a central bearing 24 that has a groove 25 extending around the circumference thereof. A stopper 26 is provided to prevent bearing rotation during use.

Figure 3:
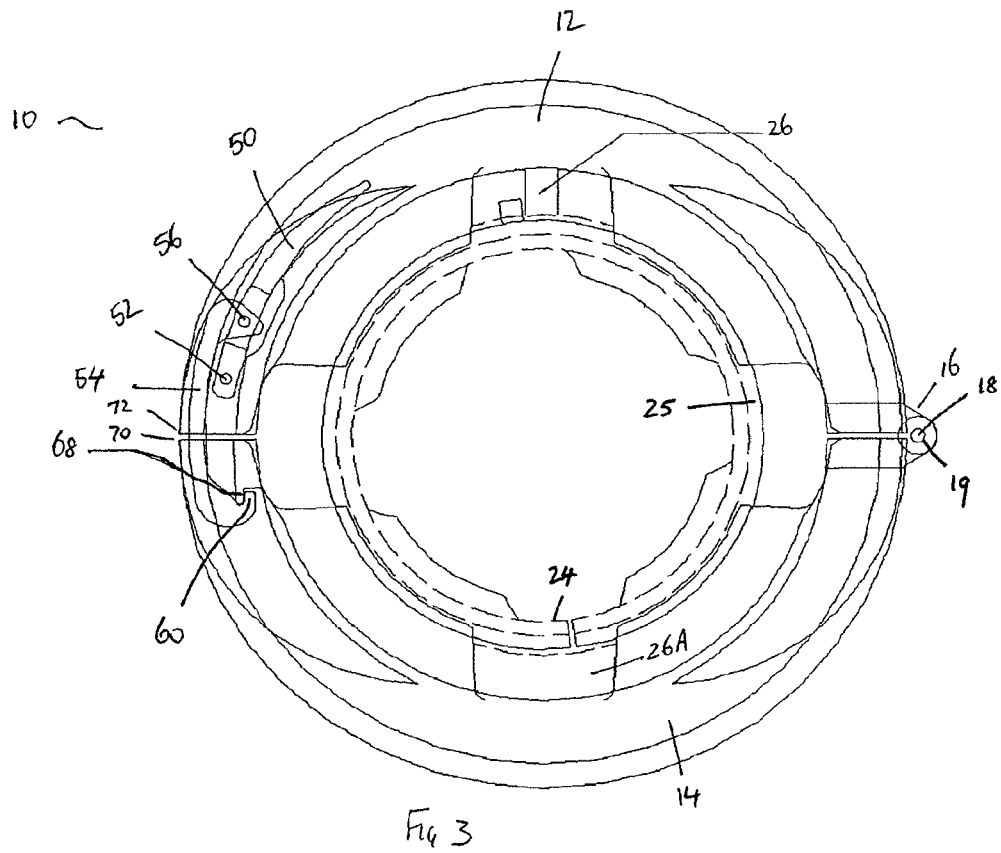
FIG. 3 shows a front view of the safety guard shown in FIG. 1, but in the closed position.

The first housing part 12 includes extensions 28, 30 that extend into groove 25 on the central bearing 24. Similarly, the second housing part 14 is provided with similar extensions 32, 34. As can be seen from FIG. 1, extensions 32, 34 are spaced apart from each other by a space 36. Space 36 is designed to accommodate stopper 26. In FIG. 1, only a single stopper 26 is shown on the central bearing. However, it will be appreciated that the central bearing 24 may be provided with another stopper that is diametrically opposed to the stopper 26. This is shown in FIG. 3 as stopper 26A.

As best shown in FIGS. 2 and 4, the safety guard 10 is designed to be fitted over an end bellows 38. End bellows 38 is normally connected to a PTO guard that extends over the shaft of the PTO. The PTO guard may be of conventional or known construction. As can be seen from FIGS. 2 and 4, end bellows 38 has a generally corrugated outer profile including respective peaks 40 and troughs 42.

The safety guard 10 includes a lower lip 44. Lower lip 44 curves inwardly and has an inwardly extending lip portion 46 that, in use, overlies the upper corrugation of the end bellows 38. It will be appreciated that the first housing part 12 includes a lower lip 44, as does the second housing part 14.

The first housing part 12 has a groove 48 formed in its outer surface. Alternatively, the outer surface of the housing parts 12, 14 may be formed with ribs and the "groove" may comprise a trough between adjacent ribs. A toggle lever 50, which corresponds to the first lever in the brief description of the invention given above, is pivotally mounted at or near one end by a hinge pin 52. Hinge pin 52 is located within the groove 48. A locking lever 54, which corresponds to the second lever in the brief description of the invention given above, is pivotally mounted by pivot pin 56 to the toggle lever 50. As can be seen from FIG. 1, the locking lever 54 includes a camming portion 58 that is arranged in conjunction with pivot pin 56 so that the locking lever 54 acts with an over-center action.

Locking lever 54 also includes a locking tongue 60 that overlies or defines a recess 62 on the locking lever 54.

The second housing part 14 also includes a groove 64 formed on its outer surface. Groove 64 houses a locking tab 66. Locking tab 66 has an extending tongue 68 that is dimensioned such that it can be received in recess 62 on the locking lever 54. Furthermore, locking tongue 60 on locking lever 54 can underlie locking tongue 68 on the locking tab 66.

In order to mount the safety guard 10, the safety guard 10 is moved to the open condition as shown in FIG. 1. The extensions 28, 30 on the first housing part 12 are positioned such that they extend into the groove 25 on the central bearing 24. This is effectively the position shown in FIG. 1. The second housing part 14 is then moved towards the first housing part 12 by moving the second housing part 14 about the hinge pin 19 that extends through opening 18. As a result of this movement, extensions 32, 34 on the second housing part move into the groove 25 on the central bearing 24. Similarly, an open end 70 of the second housing part 14 is moved adjacent to or in abutment with an open end 72 of the first housing part 12 (see FIG. 3). The toggle lever 54 is then positioned such that the locking tongue 60 underlies the extending tongue 68 on the locking tab 66 on the second housing part 14. The toggle lever 50 is then pushed rearwardly towards the first housing part 12. This causes the over-center action of the locking lever 54 to snap backwardly and lock the locking lever 54 in position. The toggle lever 50 then extends into and lies in the groove 48. This is shown in FIG. 3.

It will be appreciated that when the first housing part is positioned such that extensions 28, 30 extend into groove 25 on the central bearing 24, the lower lip 44 of the first housing part is positioned such that it overlies the upper corrugation of the end bellows 38. This is shown in FIG. 2. In this configuration, inwardly extending lip portion 46 is positioned below the peak of the end corrugation of the end bellows 38. As the second housing part 14 is pivotally moved towards the first housing part 12, the lower lip 44 on the second housing part also adopts the same configuration such that the inwardly extending lip portion 46 of the second housing part 14 overlies the peak of the upper corrugation of the end bellows 38. When the toggle lever 50 is operated to lock the locking lever 54 in place, the lower lip 44 of the respective first housing part 12 and second housing part 14 surrounds the peak of the upper corrugation of the end bellows 38 to thereby securely mount the safety guard 10 in position. The safety guard 10 is further held in place by virtue of the respective extensions 28, 30, 32, 34 extending into the groove 25 on the central bearing 24. Effectively, the safety guard 10 "wraps" itself around the wide angle joint. Removal in a direction along the longitudinal axis of the safety guard is prevented by the lower lip 44 and the extensions 28, 30, 32, 34 that extend into the groove 25 on the central bearing 24.

As can be appreciated from the embodiment shown in FIGS. 1 to 4, the safety guard 10 provides a safety guard that can be fitted over wide angle PTO joints. The safety guard 10 is very simple to fit and it is securely held in position by virtue of the lower lip 44 of the safety guard. The extensions 28, 30, 32, 34 that extend into the groove 25 on the central bearing 24 also assist in maintaining the safety guard 10 in position when it is in the locked position. The locking lever 54 and toggle lever 50 are also located in grooves 48, 64 when in the locked position. Therefore, the locking lever 54 and toggle lever 50 do not extend beyond the outer surface of the safety guard 10 when in the locked position. This reduces or minimizes the risk that flying debris may accidentally unlock the locking lever 54 or toggle lever 50.

When it is desired to remove the safety guard 10, it is a simple matter to raise or lift the toggle lever 50, which unlocks the locking lever 54. The locking lever 54 may then be removed from the locking tab 66. The first housing part 12 and the second housing part 14 may then be pivotally moved away from each other about the hinge pin 19 in order to easily remove the safety guard 10 from the wide angle joint. This is in sharp contrast to prior art wide-angle safety guards that required the use of screws to fit the safety guard to the bellows.

Figure 5:
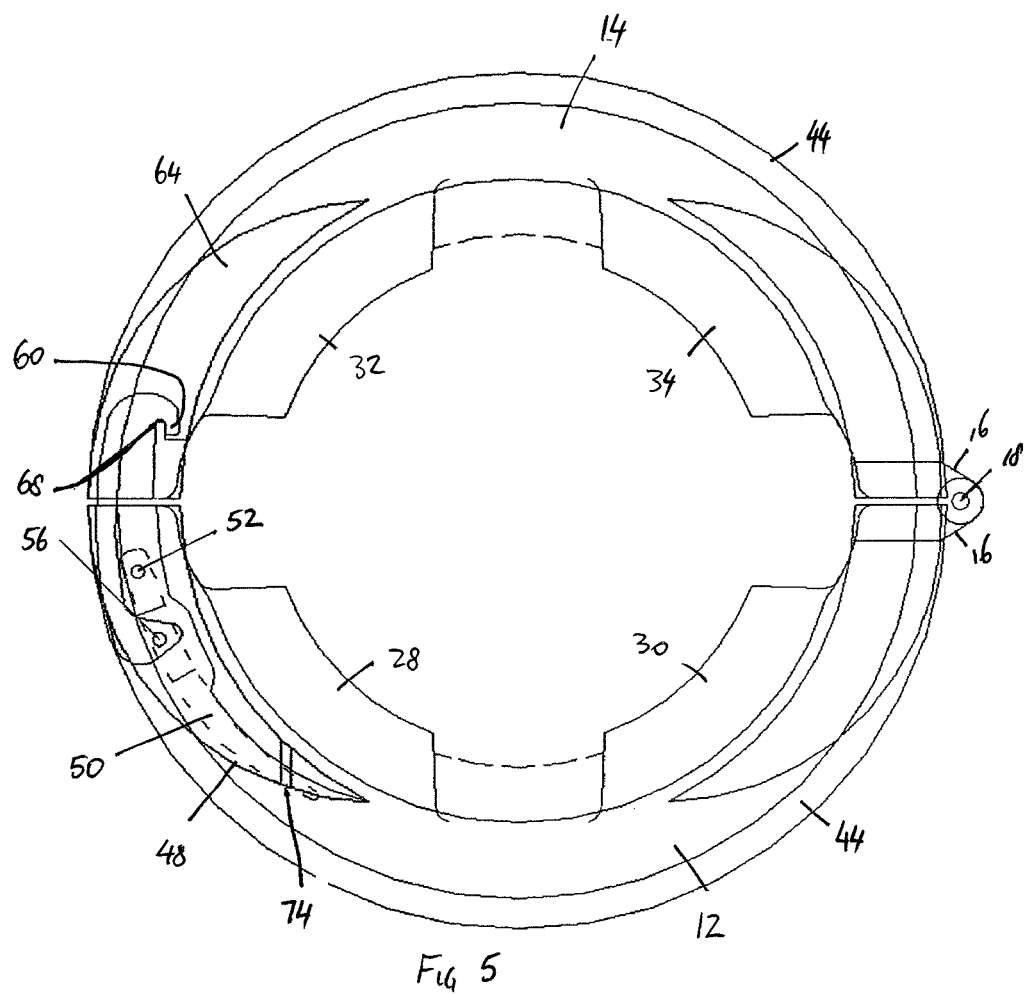
FIG. 5 is a schematic side view of a safety guard in accordance with another embodiment of the present invention.
Figure 6:
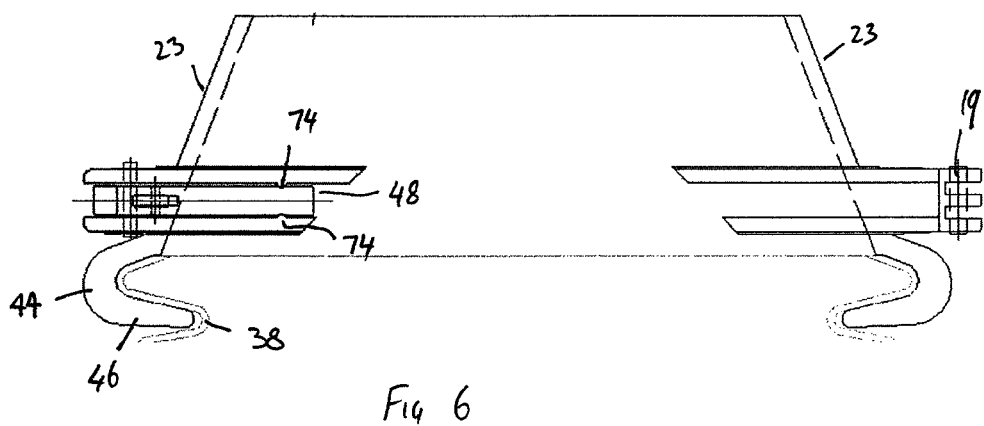
FIG. 6 is a side cross-sectional view of the safety guard shown in FIG. 5 with the locking lever positioned in a groove.

A further embodiment of the safety guard 10 of the present invention is shown in accordance with FIGS. 5 and 6. The safety guard of FIGS. 5 and 6 is largely identical to the safety guard 10 shown in FIG. 1 and, for brevity of description, features that are common between FIGS. 5 and 6 and the embodiment shown in FIGS. 1 to 4 will be denoted by like reference numerals and will not be described further.

Where the embodiment of FIG. 5 differs from the embodiment shown in FIG. 1 is that the groove 48 further includes projections 74 that extend into groove 48. Projections 74 are shaped, such as being tapered, to facilitate closing of the toggle lever 50 to a position below the projections 74. In this regard, the projections 74 may taper from a narrowest width to a widest width in a direction going from the top of the groove to the bottom of the groove 48. Thus, the toggle lever 50 can be easily pushed past the projections 74 and into the locked position by use of the finger or thumb of the operator. However, in order to move the toggle lever 50 from the locked position to an opened position, it will typically be necessary to insert a screwdriver or other similar tool under the toggle lever 50 and use the screwdriver or other similar tool to lift the toggle lever 50. Thus, the projections 74 act like a secondary lock to further assist in maintaining the toggle lever 50 in place. The projections 74 themselves act like secondary locking tongues in the groove 48.

Those skilled in the art will appreciate that the present invention may be susceptible to variations and modifications other than those specifically described. It will be understood that the present invention encompasses all such variations and modifications that fall within its spirit and scope.

Throughout this specification, the term "comprising" or its grammatical equivalence shall be taken to have an inclusive meaning unless the context of use indicates otherwise.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A safety guard for use with a wide angle joint on an agricultural power takeoff (PTO) shaft, the safety guard being for use with a PTO safety guard that covers a PTO shaft, the PTO safety guard being provided with at least one end bellows, the safety guard comprising:

a guard housing that extends around the wide-angle joint when the guard is fitted, the guard housing comprising:

a first housing part hingedly connected to a second housing part to thereby allow the first housing part and second housing part to move relatively open to each other and relatively closed to each other about a hinge; and a locking member to lock the first housing part to the second housing part in a closed condition and operable to be unlocked to allow the first housing part and the second housing part to be moved away from each other about the hinge, the locking member comprising a locking lever pivotally mounted to one of the housing parts, the locking lever being configured to engage with the other housing part when in a closed position to thereby hold the first housing part and the second housing part in a closed condition, the locking lever being fitted in a groove so that the locking lever is positioned below an outer surface of the housing when the locking lever is in the closed position; and at least one of:

each housing part including a lip on one end thereof, the lip having a profile to match a profile of the end bellows; and one or more internal members configured to engage with a groove provided in an outer surface of a guard support bearing.

2. A safety guard as claimed in claim 1 wherein each housing part includes a lip on one end thereof, the lip having a profile to match a profile of the end bellows.

3. A safety guard as claimed in claim 2 wherein the lip overlies an end corrugation of the end bellows.

4. A safety guard as claimed in claim 1 wherein the housing comprises one or more internal members configured to engage with a groove provided in an outer surface of a guard support bearing.

5. A safety guard as claimed in claim 4 wherein each housing part comprises one or more of the internal members configured to engage with the groove provided in the outer surface of the guard support bearing.

6. A safety guard as claimed in claim 1 wherein the locking lever is provided with an over-center action configured to assist in maintaining the locking lever in a closed position.

7. A safety guard as claimed in claim 1 wherein the locking lever is provided with a locking tongue configured to overlie and engage a complementary shaped tongue or aperture in the other of the housing parts.

8. A safety guard as claimed in claim 1 wherein the groove into which the locking lever is positioned when in the locked position is provided with one or more shaped projections extending into the groove, said projections being shaped to facilitate closing of the lever to a position below the projections but to resist removal of the locking lever from the groove.

9. A safety guard as claimed in claim 8 wherein the one or more projections comprise one or more tapering projections.

10. A safety guard as claimed in claim 1 wherein the locking mechanism comprises a first lever pivotally connected to one of the housing parts and a second lever having a locking tongue, wherein the second lever is pivotally connected to the first lever about an over-center action pivot connection.

11. A safety guard as claimed in claim 10 wherein the first lever and the second lever sit in the groove when in the locked position.

12. A safety guard as claimed in claim 11 wherein the groove is provided with one or more shaped projections to assist in retaining the second lever within the groove when in the locked position.

13. A safety guard for use with a wide angle joint on an agricultural power takeoff (PTO) shaft, the safety guard being for use with a PTO safety guard that covers a PTO shaft, the PTO safety guard being provided with at least one end bellows, the safety guard comprising:

a guard housing that extends around the wide-angle joint when the guard is fitted, the guard housing comprising:

a first housing part hingedly connected to a second housing part to thereby allow the first housing part and second housing part to move relatively open to each other and relatively closed to each other about a hinge, each housing part including a lip on one end thereof, the lip having a profile to match a profile of the end bellows;

a locking member to lock the first housing part to the second housing part in a closed condition and operable to be unlocked to allow the first housing part and the second housing part to be moved away from each other about the hinge, the locking member comprising a locking lever pivotally mounted to one of the housing parts, the locking lever being configured to engage with the other housing part when in a closed position to thereby hold the first housing part and the second housing part in a closed condition, the locking lever being fitted in a groove so that the locking lever is positioned below an outer surface of the housing when the locking lever is in the closed position; and one or more internal members configured to engage with a groove provided in an outer surface of a guard support bearing.

14. A safety guard as claimed in claim 13 wherein each housing part comprises one or more of the internal members configured to engage with the groove provided in the outer surface of the guard support bearing.

15. A safety guard as claimed in claim 13 wherein the locking mechanism comprises a first lever pivotally connected to one of the housing parts and a second lever having a locking tongue, wherein the second lever is pivotally connected to the first lever about an over-center action pivot connection.

16. A safety guard as claimed in claim 15 wherein the first lever and the second lever sit in the groove when in the locked position.

17. A safety guard as claimed in claim 13 wherein the groove is provided with one or more shaped projections to assist in retaining the second lever within the groove when in the locked position.

18. A safety cover for use with a wide angle joint on an agricultural power takeoff (PTO) shaft, the safety cover being for use with a PTO safety guard that covers a PTO shaft, the PTO safety guard being provided with at least one end bellows, the safety cover comprising:

a guard housing that extends around the wide-angle joint when the safety cover is fitted, the guard housing comprising:

a first housing part hingedly connected to a second housing part to thereby allow the first housing part and second housing part to move relatively open to each other and relatively closed to each other about a hinge; and a locking member to lock the first housing part to the second housing part in a closed condition and operable to be unlocked to allow the first housing part and the second housing part to be moved away from each other about the hinge, the locking member comprising a locking lever pivotally mounted to one of the housing parts, the locking lever being configured to engage with the other housing part when in a closed position to thereby hold the first housing part and the second housing part in a closed condition, the locking lever being fitted in a groove so that the locking lever is positioned below an outer surface of the housing when the locking lever is in the closed position; and each housing part including a lip on one end thereof, the lip having a profile to match a profile of the end bellows.

\* \* \* \* \*